UNITED STATES PATENT OFFICE.

ALFRED W. SPERRY, OF HARTFORD, CONNECTICUT, ASSIGNOR TO HIMSELF AND G. WELLS ROOT, OF SAME PLACE.

INSULATING MATERIAL.

SPECIFICATION forming part of Letters Patent No. 454,547, dated June 23, 1891.

Application filed October 27, 1890. Serial No. 369,522. (No specimens.)

*To all whom it may concern:*

Be it known that I, ALFRED W. SPERRY, a citizen of the United States, residing at Hartford, in the county of Hartford and State of Connecticut, have invented an Improvement in Insulating Material, of which the following is a specification.

Insulating materials of various kinds have heretofore been employed, and the same have been made into many forms for use in electrical apparatus. Some of these materials have been water-proof, but not fire, acid, and alkali proof.

In connection with the many accidents constantly occurring from the use in the arts and manufactures of the electric current it is very desirable that an insulating material be employed that is both fire and water proof and acid and alkali proof, so that property and lives may be adequately protected by the use of such material; and the object of my present invention is to provide a material that is adapted to accomplish that end.

I employ filamentous slag known as "mineral wool," which is an excellent non-conductor of electricity, and I soften the same and adapt it to being molded into sheets, plates, strips, and other electric-insulating articles by liquid silicate of soda or its equivalent silicate of potash, in about the proportion of six ounces of mineral wool to one pound of liquid silicate of soda, and these substances may be mixed and prepared in any suitable manner.

In the present invention the mineral wool is to be distinguished from mica and asbestos, which have been proposed for coatings and coverings, because there are often metallic particles with the asbestus or mica that render it inferior for electric-insulating purposes, whereas the filamentous slag is free from conducting material, and it is softened by the silicate of soda, so as to be adapted to molding into a homogeneous mass, and when there are any metals in such slag they are in the form of oxides that promote the insulating qualities, and to give body to the compound I introduce zinc-white in about the proportion of three parts of mineral wool, six parts of liquid silicate of soda, and one part of the zinc-white. The zinc-white, being a product of combustion, is incombustible, and it is an excellent non-conductor of electricity, and in combining with the silicate of soda and mineral wool it gives body to the same in such a manner as to almost entirely obviate the shrinkage and deliquescence heretofore occurring in articles containing silicate of soda. This insulating material is not injuriously affected by acids, alkali, or water, and it is a non-conductor of electricity and is not injured by the heat to which electric insulators are exposed, and this composition is easily molded and made into switch-boards and stands, lamp sockets and bases for cut-outs, push-button pipes, pole-insulators, and other articles for electric insulation.

I claim as my invention—

The electric-insulating material composed of mineral wool and silicate of soda or potash and zinc-white, substantially as set forth.

Signed by me this 23d day of October, 1890.

ALFRED W. SPERRY.

Witnesses:
GEO. T. PINCKNEY,
HAROLD SERRELL.